United States Patent
Lin et al.

(10) Patent No.: US 11,455,103 B2
(45) Date of Patent: Sep. 27, 2022

(54) CLOUD SECURED STORAGE SYSTEM UTILIZING MULTIPLE CLOUD SERVERS WITH PROCESSES OF FILE SEGMENTATION, ENCRYPTION AND GENERATION OF DATA CHUNKS

(71) Applicant: NATIONAL TAIWAN UNIVERSITY, Taipei (TW)

(72) Inventors: Tsung-Nan Lin, Taipei (TW); Yu-Ping Huang, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 17/023,816

(22) Filed: Sep. 17, 2020

(65) Prior Publication Data
US 2021/0096753 A1    Apr. 1, 2021

(30) Foreign Application Priority Data
Sep. 26, 2019    (TW) .................................. 108134757

(51) Int. Cl.
G06F 3/06    (2006.01)

(52) U.S. Cl.
CPC ............ *G06F 3/0622* (2013.01); *G06F 3/067* (2013.01); *G06F 3/0655* (2013.01)

(58) Field of Classification Search
None
See application file for complete search history.

(56) References Cited

U.S. PATENT DOCUMENTS

2011/0289194 A1* 11/2011 Lee ...................... H04L 67/1097
    709/219
2011/0311051 A1* 12/2011 Resch ................... H04L 9/3242
    380/270

(Continued)

FOREIGN PATENT DOCUMENTS

| CN | 110046521 A | 7/2019 |
|----|-------------|--------|
| CN | 110190945 A | 8/2019 |

(Continued)

OTHER PUBLICATIONS

H. Lin and W. Tzeng, "A Secure Erasure Code-Based Cloud Storage System with Secure Data Forwarding," in IEEE Transactions on Parallel and Distributed Systems, vol. 23, No. 6, pp. 995-1003, Jun. 2012 (Year: 2012).*

(Continued)

*Primary Examiner* — Edward J Dudek, Jr.
*Assistant Examiner* — Ralph A Verderamo, III
(74) *Attorney, Agent, or Firm* — Snyder, Clark, Lesch & Chung, LLP

(57) ABSTRACT

A cloud secured storage system is provided in a peer-to-peer network that includes a client end and a farm end. A user file is segmented and a hash function is used for encryption to generate a plurality of data chunks together with an Information Dispersal Algorithm. The plurality of data chunks are respectively stored in a plurality of cloud servers. The plurality of cloud servers backup the plurality of data chunks as a backup file. If the data chunk in one of the plurality of cloud servers is lost, the adjacent cloud server transmits the backup file to the cloud server where the data chunk is lost. The cloud secured storage system of the present disclosure successfully stores the user file in the plurality of cloud servers to prevent cyberattacks owing to the process of file segmentation, encryption, backup file, and algorithm.

10 Claims, 17 Drawing Sheets

(56) References Cited

U.S. PATENT DOCUMENTS

| | | | |
|---|---|---|---|
| 2012/0311345 A1* | 12/2012 | Dhuse | G06F 12/1408 713/189 |
| 2015/0169897 A1* | 6/2015 | Leggette | G06F 11/1076 713/193 |
| 2019/0268150 A1 | 8/2019 | Kariv et al. | |
| 2020/0259649 A1* | 8/2020 | Garcia Morchon | H04L 9/3093 |

FOREIGN PATENT DOCUMENTS

| | | |
|---|---|---|
| TW | M451587 U1 | 4/2013 |
| TW | 201317823 A | 5/2013 |
| TW | I413914 | 11/2013 |
| TW | 201423427 A | 6/2014 |

OTHER PUBLICATIONS

Choi S.J., Youn H.Y., Lee B.K. (2003) An Efficient Dispersal and Encryption Scheme for Secure Distributed Information Storage. In: Sloot P.M.A. et al. (eds) Computational Science—ICCS 2003. ICCS 2003. Lecture Notes in Computer Science, vol. 2660. Springer, Berlin, Heidelberg (Year: 2003).*

Michael O. Rabin. 1989. Efficient dispersal of information for security, load balancing, and fault tolerance. J. ACM 36, Apr. 2, 1989, 335-348 (Year: 1989).*

AlZain, Mohammed A. et al., "MCDB: Using Multi-Clouds to Ensure Security in Cloud Computing," In 2011 IEEE Ninth International Conference on Dependable, Autonomic and Secure Computing, pp. 784-791. IEEE, 2011.

* cited by examiner

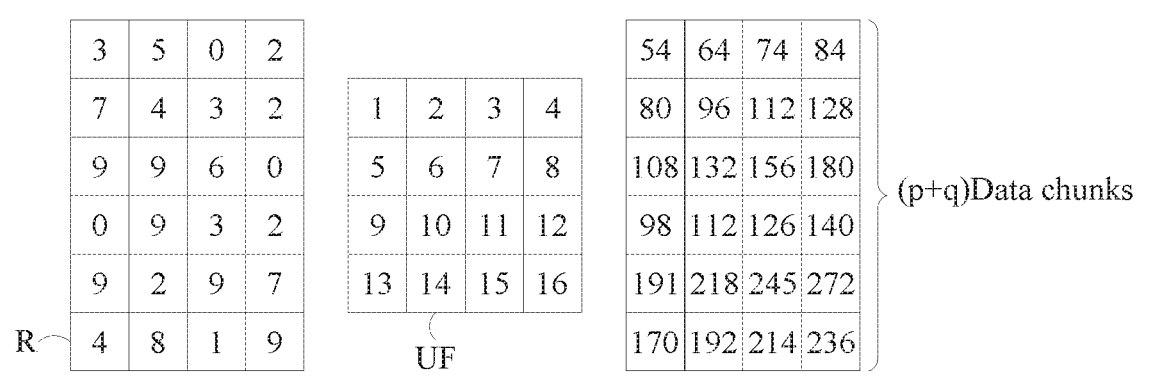

| 3 | 5 | 0 | 2 |
|---|---|---|---|
| 7 | 4 | 3 | 2 |
| 9 | 9 | 6 | 0 |
| 0 | 9 | 3 | 2 |
| 9 | 2 | 9 | 7 |
| 4 | 8 | 1 | 9 |

R

| 1 | 2 | 3 | 4 |
|---|---|---|---|
| 5 | 6 | 7 | 8 |
| 9 | 10 | 11 | 12 |
| 13 | 14 | 15 | 16 |

UF

| 54 | 64 | 74 | 84 |
|---|---|---|---|
| 80 | 96 | 112 | 128 |
| 108 | 132 | 156 | 180 |
| 98 | 112 | 126 | 140 |
| 191 | 218 | 245 | 272 |
| 170 | 192 | 214 | 236 |

} (p+q)Data chunks

FIG. 4

CLOUD SECURED STORAGE SYSTEM UTILIZING MULTIPLE CLOUD SERVERS WITH PROCESSES OF FILE SEGMENTATION, ENCRYPTION AND GENERATION OF DATA CHUNKS

CROSS-REFERENCE TO RELATED APPLICATION

This application claims priority from Taiwan Patent Application No. 108134757, filed on Sep. 26, 2019, in the Taiwan Intellectual Property Office, the content of which is hereby incorporated by reference in its entirety for all purposes.

BACKGROUND

1. Technical Field

The present disclosure relates to a cloud secured storage system that is able to prevent cyberattacks by utilizing multiple cloud servers together with the process of file segmentation, encryption, file backup, and algorithm.

2. Description of the Related Art

The number of providers providing cloud storage services, such as Google Cloud, Amazon S3, Microsoft Azure, and Apple iCloud, etc., has increased due to benefits that cloud storage services may bring to users. The current cloud storage services are provided to users in a way of a single cloud drive. A single cloud drive may only provide limited storage capacity and security, resulting in limitations on usage.

A previous patent application, Taiwanese Patent No. M451587, controls the input, output, encryption, and decryption of files using an access module and a security module and increases storage capacity by providing multiple storage modules. However, the previous patent application conducts encryption and decryption with a single cloud drive and improvement of storage capacity, which is still likely for cyber hackers to hack into a single cloud drive to steal data and does not take into consideration the loss of files in the cloud drive.

Accordingly, the inventor of the present disclosure has designed a cloud secured storage system in an effort to tackle deficiencies in the prior art and further to enhance the implementation and application in industries.

SUMMARY

According to the problems mentioned above, the objective of the present disclosure is to provide a cloud secured storage system to solve the problems that may be encountered in the prior art.

Based on the above, the present disclosure provides a cloud secured storage system provided in a peer-to-peer network that includes a client end and a farm end, including a user server and a plurality of cloud servers. The user server is provided on a node of the client end, receives a user file, and includes an encryption and decryption engine, an algorithm engine, and a first transmission interface. The user server segments the user file into a plurality of data units. The encryption and decryption engine encrypts each of the plurality of data units and utilizes a hash function to operate to determine a hash value of each of the data units. The algorithm engine generates a stochastic matrix according to a size of each of the data units being encrypted. The algorithm engine operates to determine a plurality of data chunks according to each of the data units being encrypted and the stochastic matrix. A number of the plurality of data chunks and a number of the plurality of data units differ from each other. The first transmission interface transmits each of the plurality of data chunks. A plurality of cloud servers are provided on a node of the farm end and each of the plurality of cloud servers has a second transmission interface, a distribution module, and an identification number, the second transmission interface of one of the plurality of cloud servers receives the plurality of data chunks, and the distribution module of the cloud server that receives the plurality of data chunks distributes the plurality of data chunks to the plurality of cloud servers according to each of the identification numbers and a hash value corresponding to each of the plurality of data chunks. The cloud secured storage system of the present disclosure successfully stores the user file in the plurality of cloud servers to prevent cyberattacks owing to the process of file segmentation, encryption, and algorithm.

Preferably, the user server has a database that stores the hash value respectively corresponding to each of the plurality of data chunks.

Preferably, if the plurality of cloud servers includes an idle cloud server, one of the plurality of cloud servers detects the idle cloud server that does not store the data chunk to reach load balancing.

Preferably, each of the cloud servers backups the plurality of data chunks and stores the plurality of data chunks as a backup file.

Preferably, when the data chunk stored in one of the plurality of cloud servers is lost, the cloud server adjacent to the cloud server where the data chunk is lost transmits the backup file to the cloud server where the data chunk is lost.

Based on the above, the present disclosure provides a cloud secured storage system provided in a peer-to-peer network that includes a client end and a farm end, including a user server and a plurality of cloud servers. A user server is provided on a node of the client end and includes an encryption and decryption engine, an algorithm engine, and a first transmission interface, and the user server transmits a download request which has a hash value. A plurality of cloud servers are provided on a node of the farm end and each of the plurality of cloud servers has a second transmission interface, an identification number, and a data chunk. The second transmission interface of one of each of the plurality of cloud servers receives the download request. The cloud server that receives the download request searches for the corresponding cloud servers according to the hash value and collects the data chunk that the cloud servers have. The cloud server that receives the download request transmits the plurality of data chunks to the user server. The user server confirms a number and a size of the plurality of data chunks. The algorithm engine reconstructs the plurality of data units according to (i) an inverse stochastic matrix corresponding to each of the data chunks and (ii) each of the data chunks. The encryption and decryption engine decrypts the plurality of data units. The user server integrates the plurality of data units into a user file. The cloud secured storage system of the present disclosure successfully downloads the user file from a plurality of cloud servers and rebuilds the user file with the inverse stochastic matrix.

Preferably, if the plurality of cloud servers includes an idle cloud server, one of the plurality of cloud servers detects the idle cloud server that does not store the data chunk to reach load balancing.

Preferably, each of the cloud servers backups the plurality of data chunks and stores the plurality of data chunks as a backup file.

Preferably, when the data chunk stored in one of the plurality of cloud servers is lost, the cloud server adjacent to the cloud server where the data chunk is lost transmits the backup file to the cloud server where the data chunk is lost. Through the aforementioned configuration, the user file may be rebuilt by transmitting the backup files to the cloud server where the data chunk is lost in real-time.

Preferably, the plurality of cloud servers are divided into a private server and a public server; wherein when the second transmission interface of the private server receives the download request, the private server preferentially collects the data chunks that the cloud servers have; when the second transmission interface of the public server receives the download request, the public server searches for the plurality of corresponding data chunks according to the hash value and collects the plurality of data chunks from the cloud servers.

Accordingly, the cloud secured storage system of the present disclosure successfully stores the user file in the plurality of cloud servers to prevent cyberattacks owing to the process of file segmentation, encryption, backup file, and algorithm.

BRIEF DESCRIPTION OF THE DRAWINGS

FIG. 4 is a schematic diagram of the Information Dispersal Algorithm of the cloud secured storage system according to the present disclosure.

DESCRIPTION OF THE PREFERRED EMBODIMENTS

The advantages, features, and technical methods of the present disclosure are to be explained in detail with reference to the exemplary embodiments and the drawings for a better understanding of the present disclosure. Moreover, the present disclosure may be realized in different forms, and should not be construed as being limited to the embodiments set forth herein. Conversely, for a person of ordinary skill in the art, the embodiments provided shall make the present disclosure convey the scope more thoroughly, comprehensively, and completely. In addition, the present disclosure shall be defined only by the appended claims.

It should be noted that although the terms "first," "second," and the like may be used in the present disclosure to describe various elements, components, regions, layers and/or parts, these elements, components, regions, layers and/or parts should not be limited by these terms. These terms are only used to distinguish one element, component, region, layer, and/or part from another element, component, region, layer, and/or part. Hence, the "first element", "first component", "first region", "first layer", and/or "first part" discussed hereinafter may be referred to as "second component", "second region", "second layer", and/or "second part" without departing from the teachings of the present disclosure.

In addition, the terms "include" and/or "contain" are used to indicate the presence of features, regions, entirety, steps, operations, elements and/or components, but may not exclude the presence or addition of one or more of other features, regions, entirety, steps, operations, elements, components, and/or combinations thereof.

Unless otherwise defined, all terms (including technical and scientific terms) used in the present disclosure have the same meaning as those commonly understood by a person of ordinary skill in the art. It should be further understood that, unless explicitly defined herein, the terms such as those defined in commonly used dictionaries should be interpreted as having definitions consistent with their meaning in the context of the related art and the present disclosure, and should not be construed as idealized or overly formal.

Figure 1:
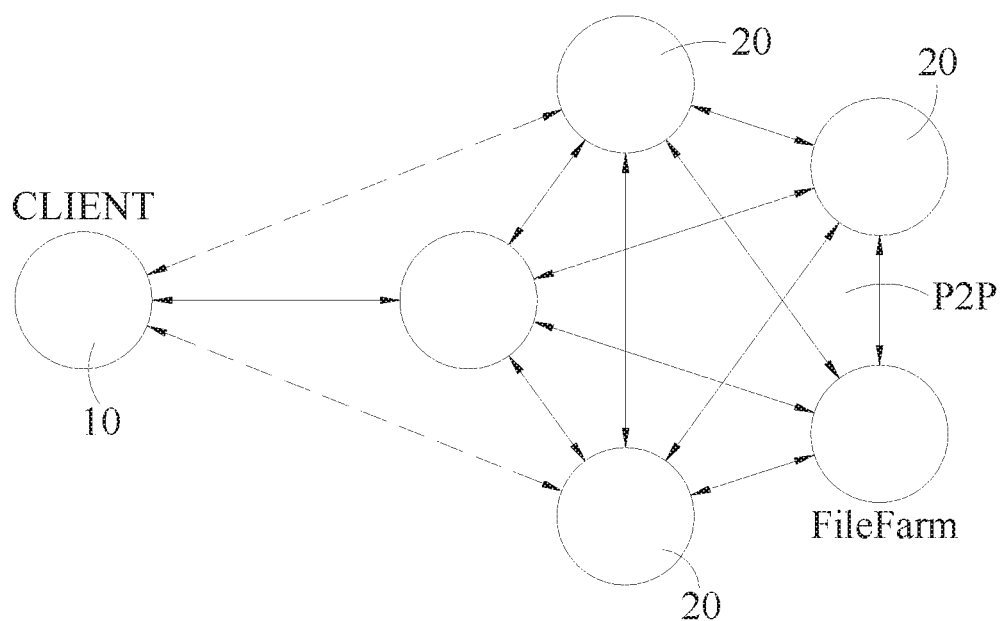
FIG. 1 is a configuration diagram of the first embodiment of the cloud secured storage system according to the present disclosure.
Figure 2:
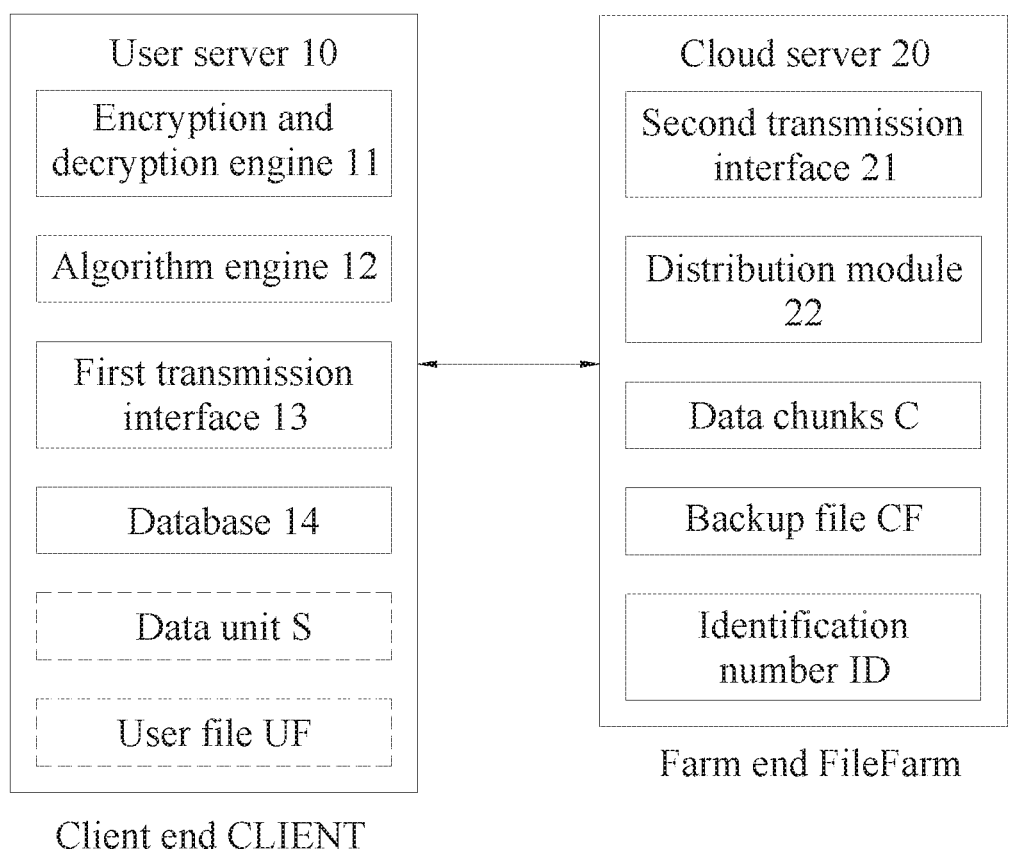
FIG. 2 is a block diagram of the first embodiment of the cloud secured storage system according to the present disclosure.

Referring to FIG. 1 and FIG. 2, the figures are respectively a configuration diagram of the first embodiment of the cloud secured storage system according to the present disclosure and a block diagram of the first embodiment of the cloud secured storage system according to the present disclosure. As shown in FIG. 1 and FIG. 2, the cloud secured storage system of the present disclosure is provided in a peer-to-peer network P2P that includes a client end CLIENT and a farm end FileFarm, including a user server 10 and a plurality of cloud servers 20. The user server 10 is provided on a node of the client end CLIENT, receives a user file UF, and includes an encryption and decryption engine 11, an algorithm engine 12, a first transmission interface 13, and a database 14. The user server 10 segments the user file UF into a plurality of data units S. The encryption and decryption engine 12 encrypts each of the plurality of data units S and utilizes a hash function to operate to determine a hash value of each of the data units S. The algorithm engine 12 generates a stochastic matrix R as shown in FIG. 4 according to the size of each of the data units S being encrypted. The algorithm engine 12 operates to determine a plurality of data chunks C according to each of the data units S being encrypted and the stochastic matrix R. The number of the plurality of data chunks C and the number of the plurality of data units S differ from each other. The first transmission interface 13 transmits each of the plurality of data chunks C. The database 14 stores the hash value respectively corresponding to each of the plurality of data chunks. A plurality of cloud servers 20 are provided on a node of the farm end FileFarm and each of the plurality of cloud servers 20 has a second transmission interface 21, a distribution module 22, and an identification number ID. The second transmission interface 21 of one of the plurality of cloud servers 20 receives the plurality of data chunks C. The distribution module 22 of the cloud server 20 that receives the plurality of data chunks C distributes the plurality of data chunks C to the plurality of cloud servers 20 according to each of the identification numbers ID and a hash value corresponding to each of the plurality of data chunks C. Each of the cloud servers 20 backups the plurality of data chunks C and stores the plurality of data chunks as a backup file CF. The cloud secured storage system of the present disclosure successfully stores the user file UF in the plurality of cloud servers 20 to prevent cyberattacks owing to the process of file segmentation, encryption, and algorithm.

Specifically, the algorithm engine 12 utilizes the Information Dispersal Algorithm (IDA) for the generation of the stochastic matrix R and the operation of the plurality of data chunks C. Because of the configuration of the IDA, it is difficult for a cyber hacker to reconstruct a user file UF from a node other than the user server 10. The creation of the identification number ID of the plurality of cloud servers 20, the encryption of each data unit S, and the acquisition of hash values are achieved using the Kademlia network structure (a network protocol implemented using the Distributed Hash Table). The distribution module 22 of each cloud server 20 searches for multiple adjacent cloud servers 20 according to the hash value of each data chunk C and distributes the plurality of data chunks C to the multiple adjacent cloud servers 20. The number of bits of the identification number ID of the plurality of cloud servers 20 is adjusted according to actual needs and may be for example 4 or 5 without being limited in the scope exemplified by the present disclosure.

In addition, the backup file CF of each cloud server 20 is adjusted according to the number of the plurality of cloud servers 20 (The number of backup files CF is typically equal to the number of cloud servers 20.) without being limited in the scope exemplified by the present disclosure. When the data chunk C stored in one of the plurality of cloud servers 20 is lost (only part of the data chunk C is lost in the cloud server 20 at the moment instead of no data chunk C stored therein.), the cloud server 20 where the data chunk C is lost sends a republishing message, and the cloud server 20 adjacent to the cloud server 20 where the data chunk C is lost receives the republishing message and transmits the backup file CF to the cloud server 20 where the data chunk C is lost. If the plurality of cloud servers 20 include an idle cloud server (a cloud server 20 not functioning properly), the idle cloud server also sends a republishing message, and the cloud server 20 adjacent to the idle cloud server detects the idle cloud server that does not store the data chunk C by receiving the republishing message, and transmits the backup file CF to the idle cloud server to reach load balancing.

In addition, the user server 10 and the cloud server 20 may be workstation computers or supercomputers, or they may also be other electronic devices with server functions without being limited in the scope exemplified by the present disclosure.

Figure 3:
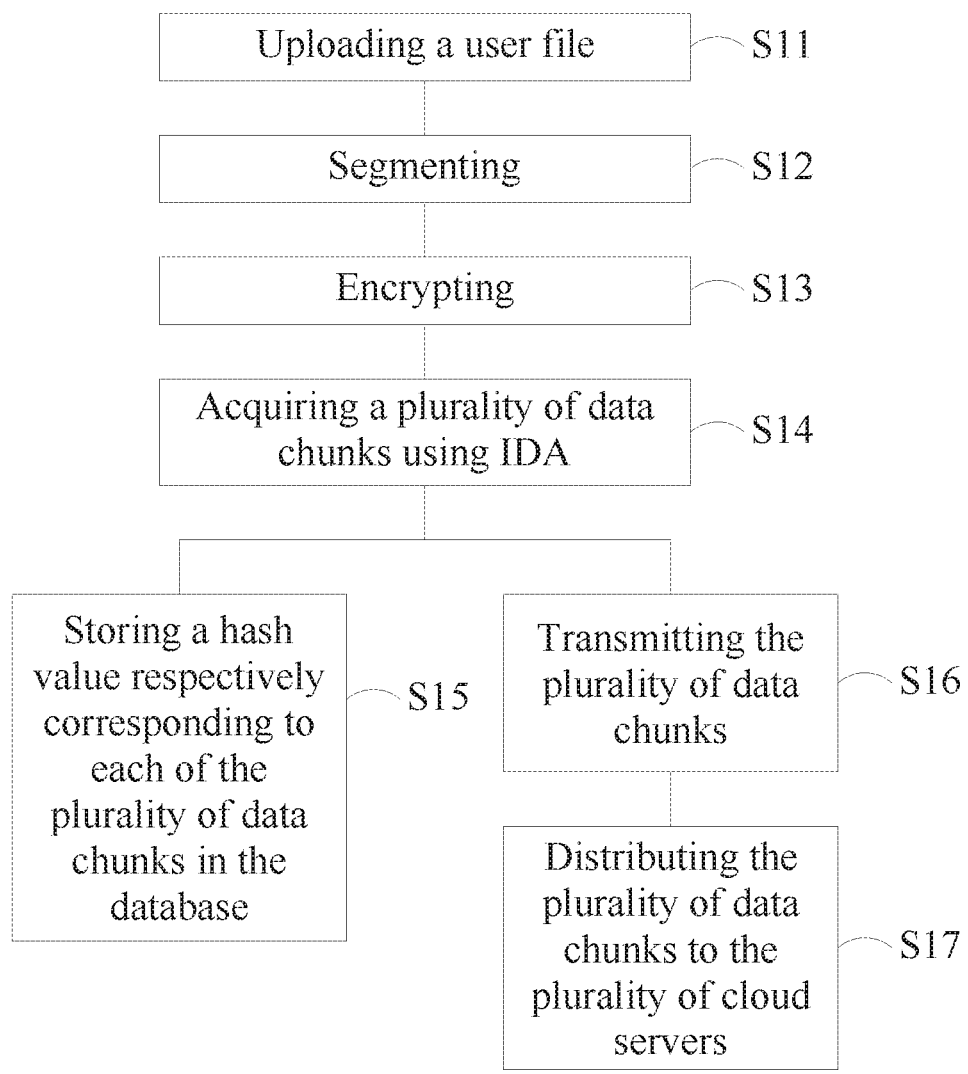
FIG. 3 is a flowchart of the first embodiment of the cloud secured storage system according to the present disclosure.

Referring to FIG. 3 and FIG. 4, the figures are respectively a flowchart of the first embodiment of the cloud secured storage system according to the present disclosure and a schematic diagram of the Information Dispersal Algorithm of the cloud secured storage system according to the present disclosure. As shown in FIG. 3 and FIG. 4, together with FIG. 1 and FIG. 2, the procedure of uploading a user file UF of the cloud secured storage system of the present disclosure is described as follows: (1) Step S11: The user uploads a user file UF to the user server 10 through an electronic device, or the electronic device used by the user has a user server 10, and the user server 10 receives the user file UF. Specifically, the electronic devices include desktop computers, notebook computers, tablet computers, and mobile phones, which may also be other electronic devices with network functions without being limited in the scope exemplified by the present disclosure.

(2) Step S12: The user server 10 segments the user file UF into a plurality of data units S.

(3) Step S13: The encryption and decryption engine 11 utilizes a hash function to encrypt a plurality of data units S. Each encrypted data unit S has a hash value, and each data unit S has a different hash value according to the bit length thereof. Therefore, the hash values of the data units S are different from each other.

(4) Step S14: The algorithm engine 12 utilizes the information dispersal algorithm (IDA) to operate the stochastic matrix R of each data unit S as shown in FIG. 4 (The size of the stochastic matrix is (p+q)×p). The size of each data unit S is F bytes and has p rows. Each data unit S is multiplied with the stochastic matrix R to acquire multiple data chunks C. The size of a single data chunk C is $$(p+q) \times \frac{|F|}{p}.$$

For instance, the size of each data unit S is 16 bytes and has 4 rows, the size of the stochastic matrix R is 6×4, and the size of a single data chunk C is 6×4. Then, the multiple data chunks C of each data unit S are integrated into the plurality of data chunks C.

(5) Step S15: The database 14 stores the hash value respectively corresponding to each of the plurality of data chunks C.

(6) Step S16: The first transmission interface 13 transmits the plurality of data chunks C to the second transmission interface 21 of one of the plurality of cloud servers 20. It should be noted that because of the configuration of the peer-to-peer network, the network structure between the user server 10 and the plurality of cloud servers 20 is decentralized, and the first transmission interface 13 of the user server 10 transmits the plurality of data chunks C to the second transmission interface 21 of one of the cloud servers 20 instead of having the need for the consent for access from other cloud servers 20, thus simplifying the transmission of the user server 10.

(7) Step S17: The distribution module 22 of the cloud server 20 that receives a plurality of data chunks C distributes the plurality of data chunks C to the multiple cloud servers 20 adjacent to the cloud server 20 that receives the data chunk C according to the characteristics of the Kademlia network structure and the identification number of each cloud server 20, thus successfully completing the upload of the plurality of data chunks C.

Figure 5:
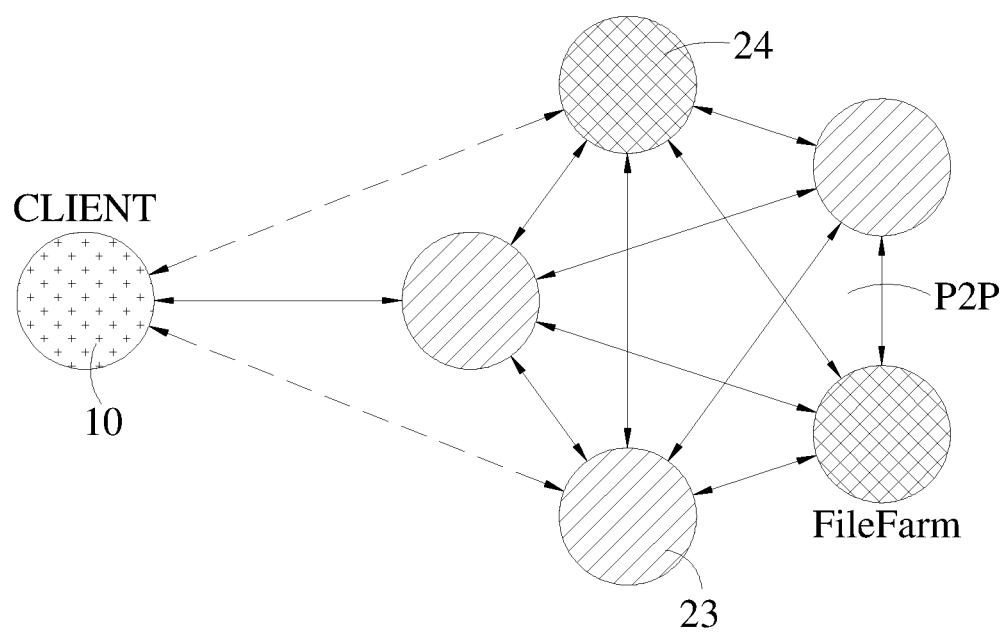
FIG. 5 is a configuration diagram of the second embodiment of the cloud secured storage system according to the present disclosure.
Figure 6:
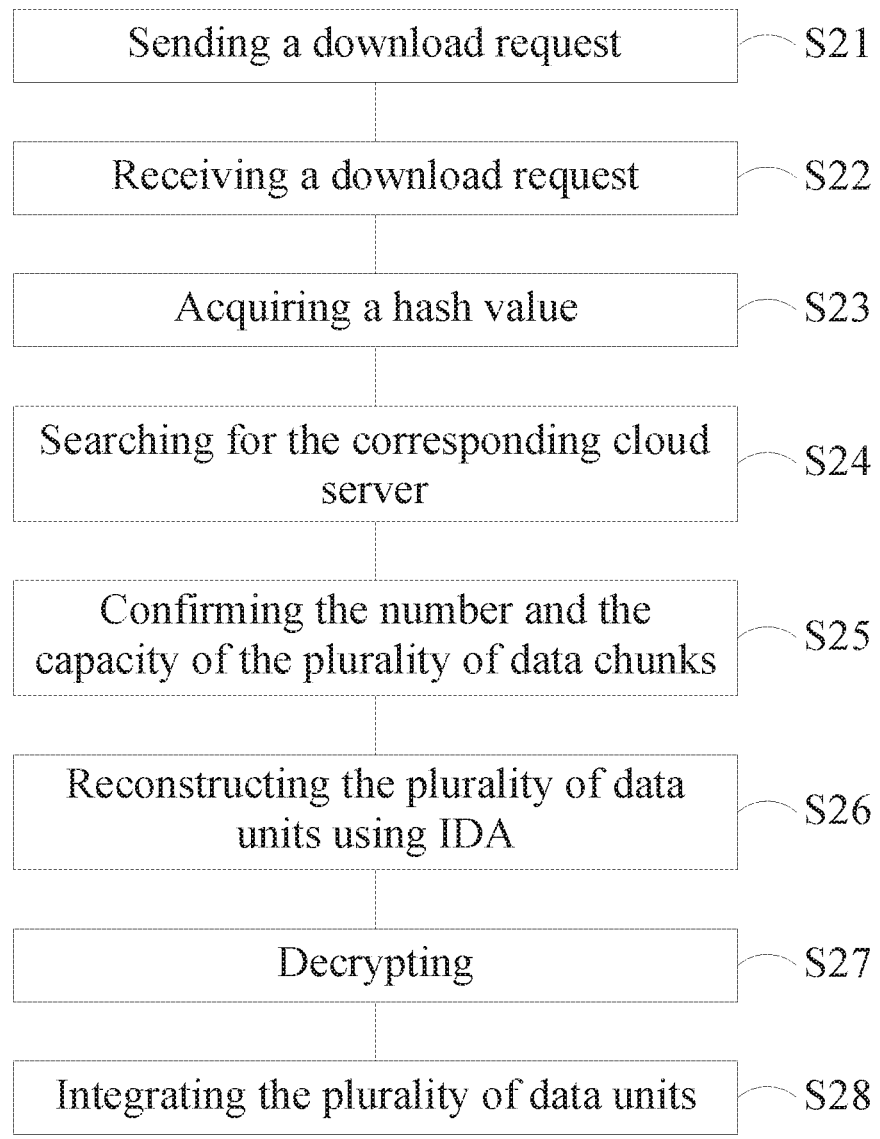
FIG. 6 is a flowchart of the second embodiment of the cloud secured storage system according to the present disclosure.

Referring to FIG. 5 and FIG. 6, the figures are respectively a configuration diagram of the second embodiment of the cloud secured storage system according to the present disclosure and a flowchart of the second embodiment of the cloud secured storage system according to the present disclosure. In the embodiment, the configuration of the same components with the same numerals is similar to that described above, so the similar descriptions are not to be described herein.

As shown in FIG. 5, the second embodiment of the present disclosure differs from the first embodiment in that the plurality of cloud servers 20 are divided into a public server 23 and a private server 24. In general, the public server 23 is provided by a cloud service provider (for example, Google or Microsoft), and the private server 24 is constructed inside an enterprise. Through the mixed configuration of the public server 23 and the private server 24, the file transmission fee of the public servers 23 may be reduced, thus improving the speed of file downloading. Specifically, the private server 24 has the right of prioritized download; that is, the private server 24 immediately prioritizes downloading a plurality of data chunks C over the public servers 23. If no private server 24 exists in the plurality of cloud servers 20, the public server 23 has the right of prioritized download. The number of the public server 23 and the private server 24 may be varied according to actual needs. For instance, the number of public servers 23 is two, and the number of private servers 24 is three. The aforementioned description is only an example and not limited to the scope of the present disclosure.

As shown in FIG. 6, together with FIG. 1, FIG. 2, and FIG. 5, the procedure of uploading the user file UF of the cloud secured storage system of the present disclosure is described as follows: (1) Step S21: The user server 10 sends a download request, and the download request has a hash value.

(2) Step S22: The second transmission interface 21 of one of the plurality of cloud servers 20 receives the download request. Specifically, if the cloud server 20 that receives the download request is the public server 23, proceed to step S23; if the cloud server 20 that accepts the download request is the private server 24, the private server 24 preferentially collects the data chunks C that the cloud servers 20 have, and then directly proceed to step S25.

(3) Step S23: The cloud server 20 that receives the download request acquires the hash value of the download request.

(4) Step S24: The cloud server 20 that receives the download request searches for each cloud server 20 to which a plurality of data chunks C corresponding to the hash value belong according to the required hash value and by using the command of the NODE-LOOKUP in the Kademlia network structure. The cloud server 20 that receives the download request searches for the plurality of data chunks C stored in the plurality of cloud servers 20 corresponding to the hash value according to the required hash value and by using the command of the VALUE-LOOKUP in the Kademlia network structure. Moreover, the plurality of data chunks C stored in each cloud server 20 may be repeatedly searched until the data chunk C corresponding to the hash value is found. Then, each cloud server 20 transmits the plurality of data chunks C corresponding to the hash value to the cloud server 20 that receives the download request.

(5) Step S25: The cloud server 20 that receives the download request integrates the plurality of data chunks C and confirms whether the number and size of the plurality of data chunks C are correct. If the number and size of the plurality of data chunks C downloaded are not the number and size of the plurality of data chunks C uploaded, return to step S24. The plurality of cloud servers 20 corresponding to the hash value and the plurality of data chunks C stored respectively are searched again. If the number and size of the plurality of data chunks C downloaded match the number and size of the plurality of data chunks C uploaded, the cloud server 20 that receives the download request transmits the plurality of data chunks C to the user server 10. The process then moves to Step S26.

(6) Step S26: The first transmission interface 13 receives the plurality of data chunks C, and the algorithm engine 12 reconstructs a plurality of data units S according to (i) the inverse stochastic matrix (The inverse stochastic matrix is the inverse matrix of the stochastic matrix.) corresponding to each data chunk C and (ii) each data chunk C.

(7) Step S27: The encryption and decryption engine 11 decrypts each data unit S.

(8) Step S28: The user server 10 integrates the decrypted plurality of data units S into a user file UF.

Figure 7:
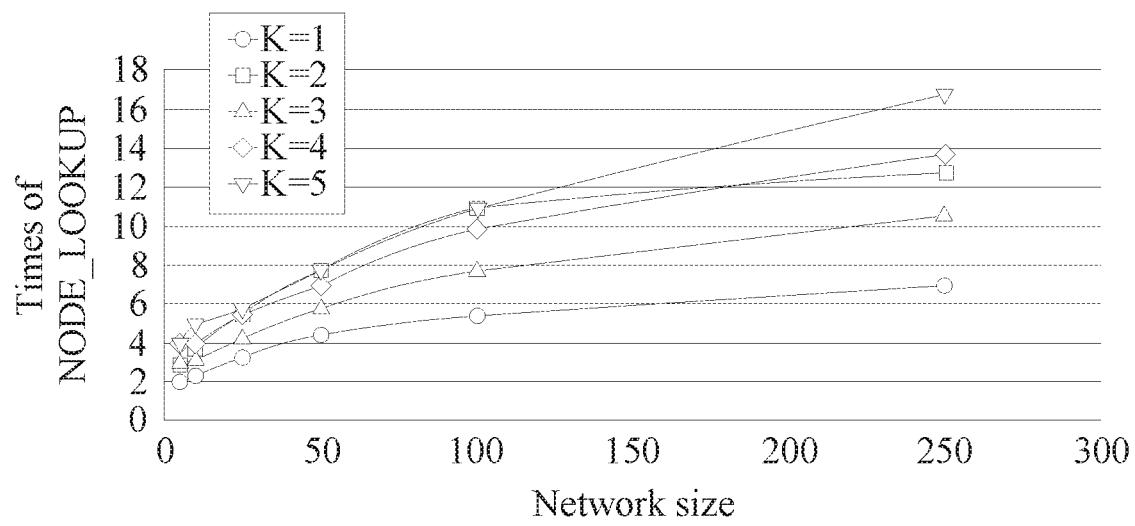
FIG. 7 is a frequency graph of NODE_LOOKUP of the cloud secured storage system according to the present disclosure.
Figure 8:
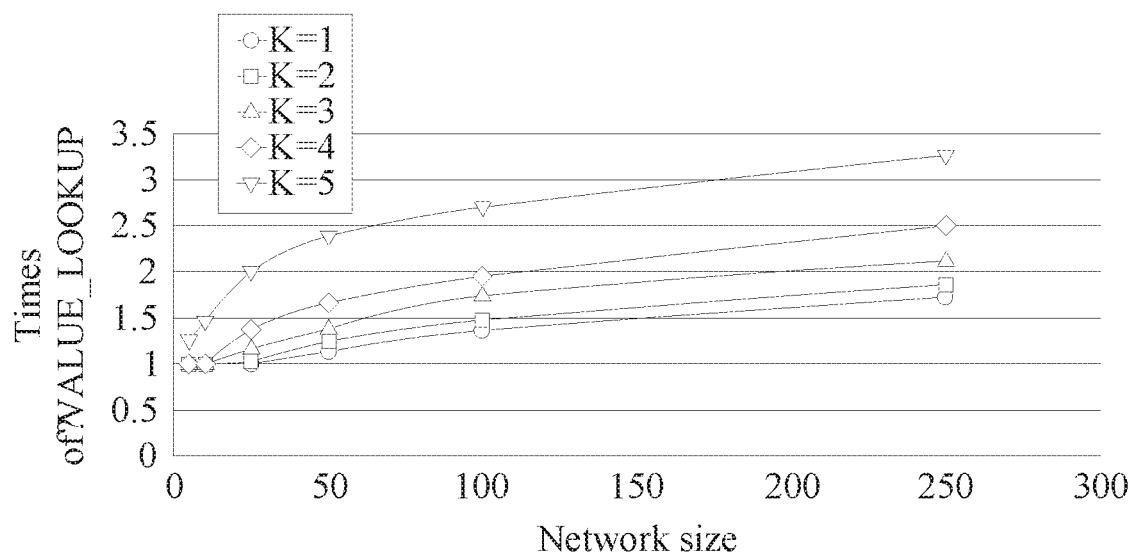
FIG. 8 is a frequency graph of VALUE_LOOKUP of the cloud secured storage system according to the present disclosure.

As shown in FIG. 7 and FIG. 8, the figures are a frequency graph of NODE_LOOKUP of the cloud secured storage system according to the present disclosure and a frequency graph of VALUE_LOOKUP of the cloud secured storage system according to the present disclosure respectively. As shown in FIG. 7 and FIG. 8, the greater the network size is, the more times the NODE_LOOKUP and VALUE_LOOKUP are looked up; the greater the number (K) of cloud servers, the more times the NODE_LOOKUP and VALUE_LOOKUP are looked up. Specifically, the maximum times for looking up of NODE_LOOKUP is [log (n)]+c, n is the network size, and c is a constant.

Figure 9:
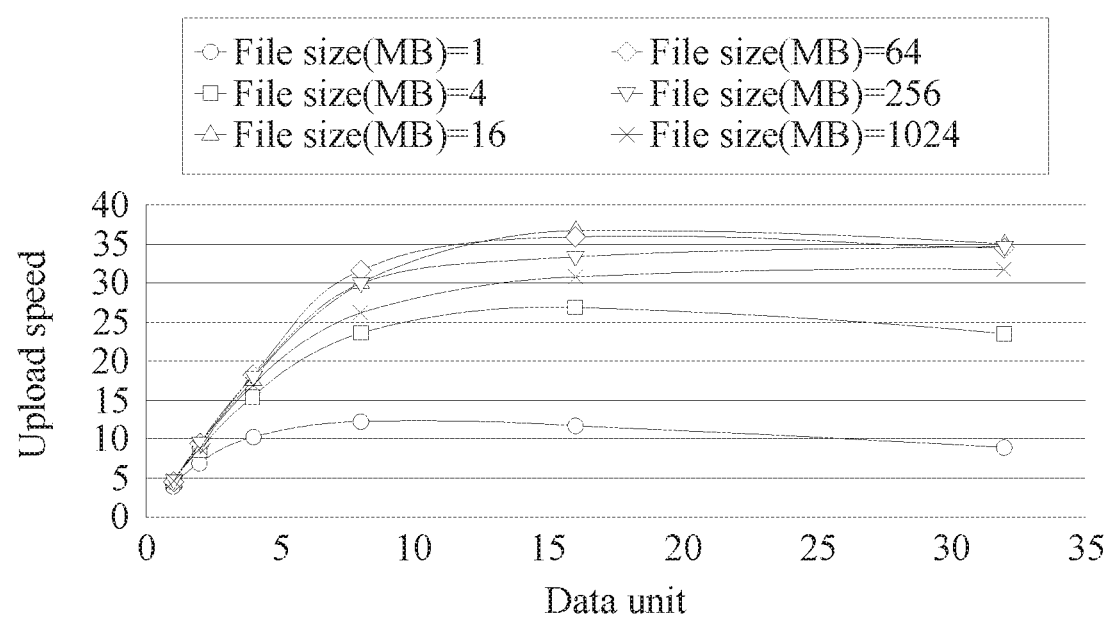
FIG. 9 is a graph of upload speed of the cloud secured storage system according to the present disclosure.
Figure 10:
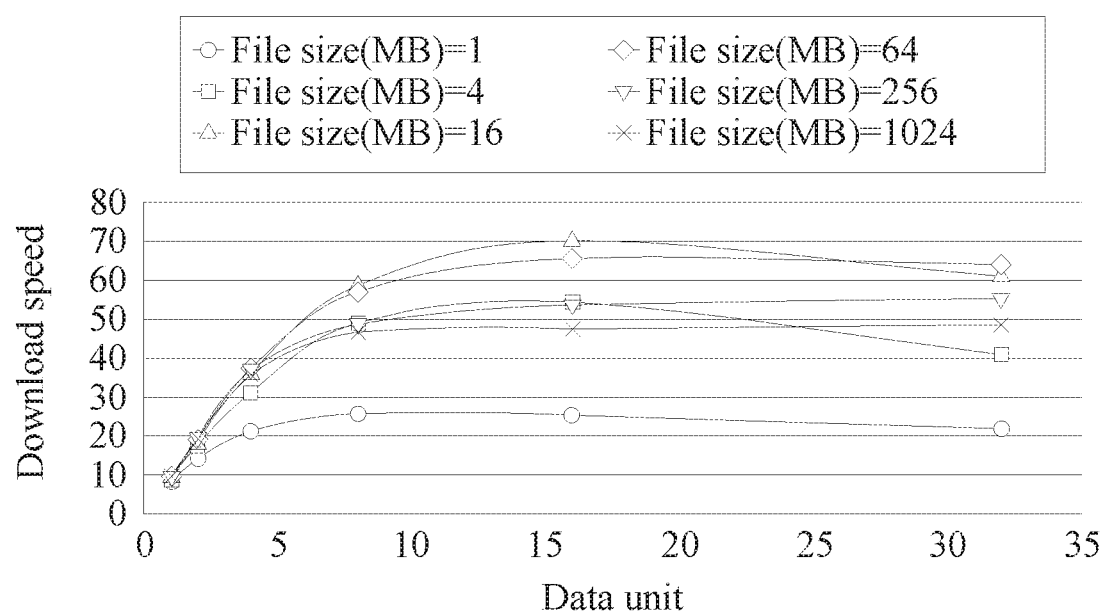
FIG. 10 is a graph of download speed of the cloud secured storage system according to the present disclosure.
Figure 11A:
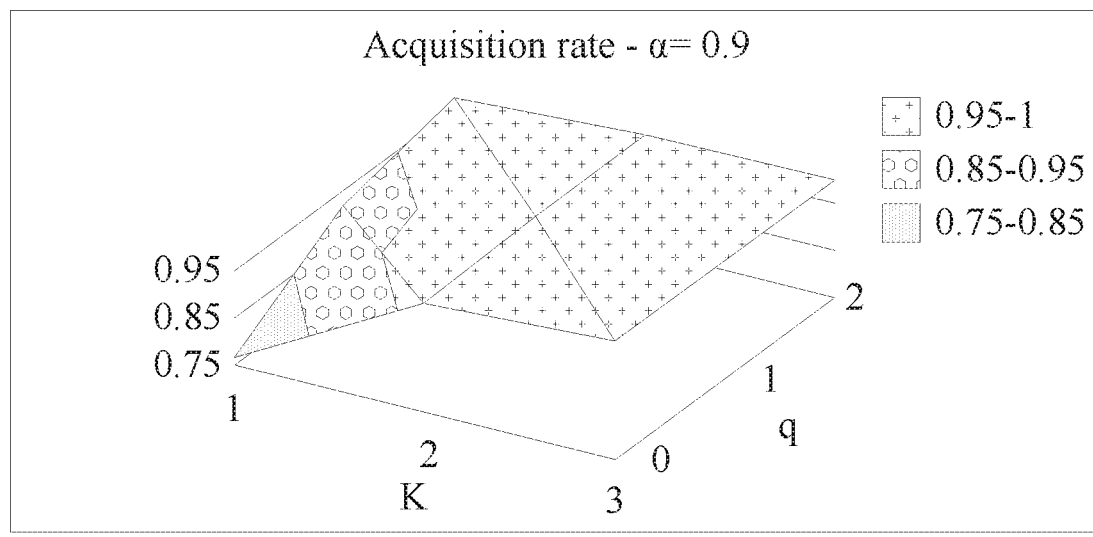
FIG. 11A to FIG. 11D are graphs of acquisition rate of the cloud secured storage system according to the present disclosure.
Figure 11B:
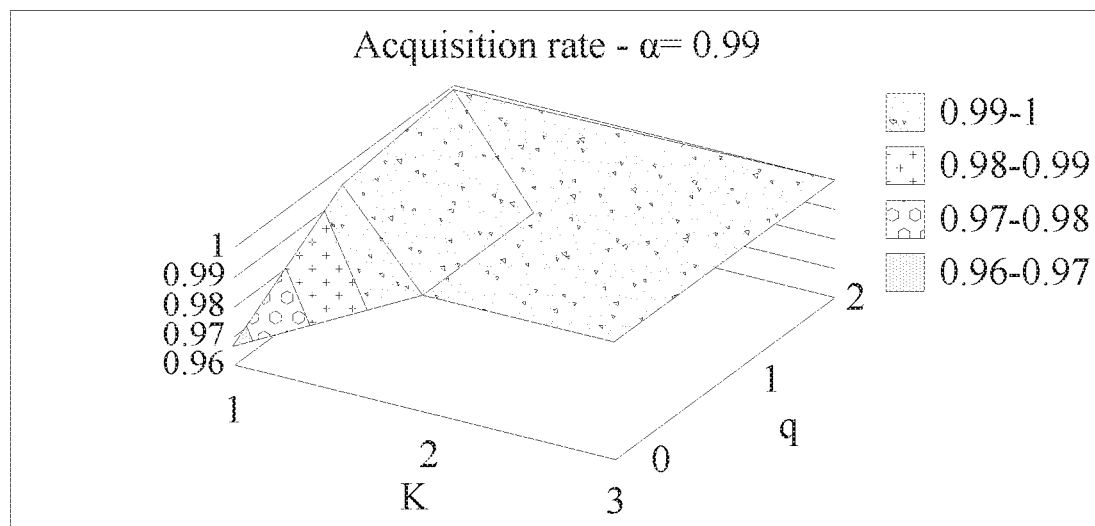
Figure 11C:
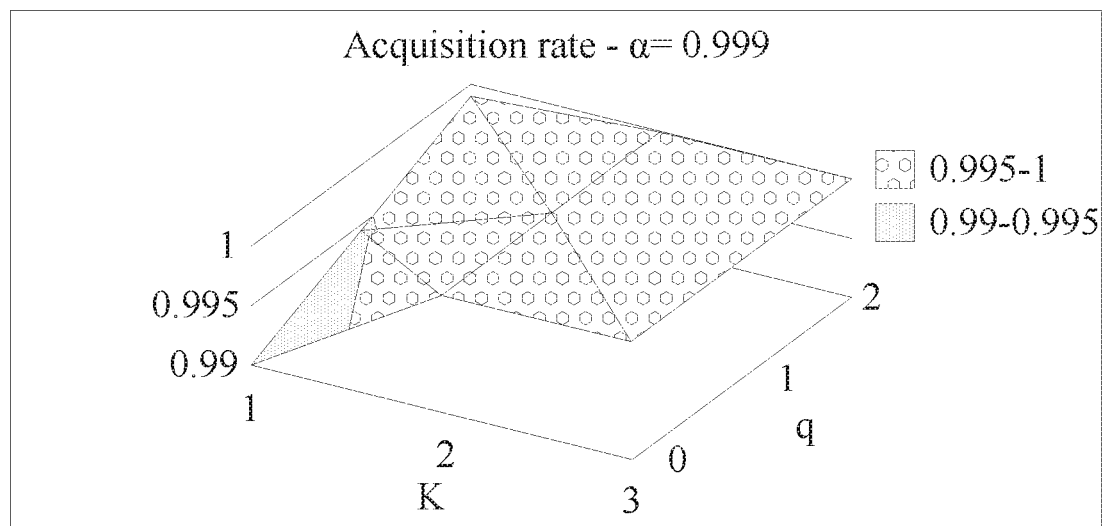
Figure 11D:
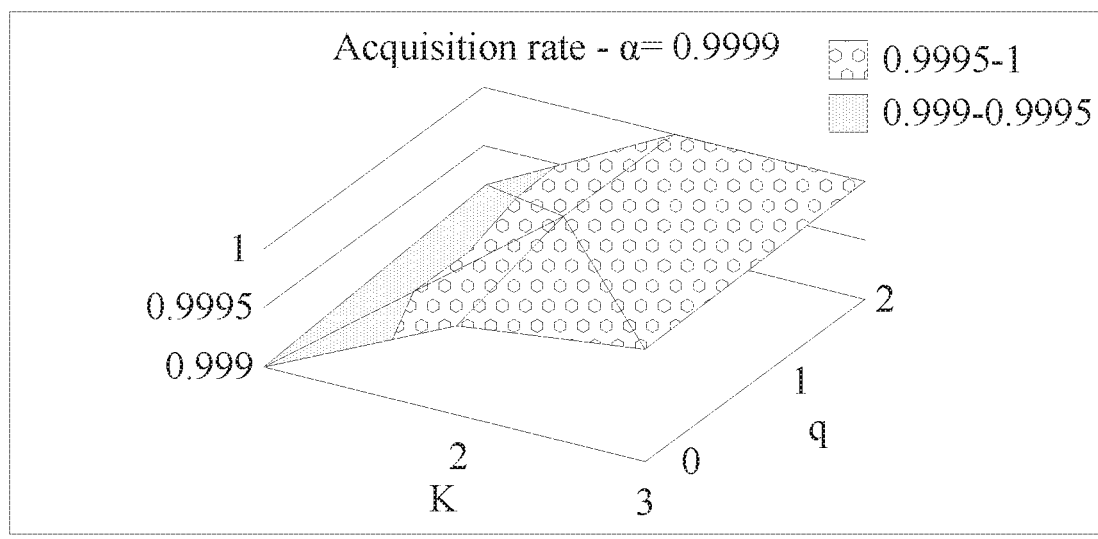

Referring to FIG. 9 and FIG. 10, the figures are respectively a graph of upload speed of the cloud secured storage system according to the present disclosure and a graph of download speed of the cloud secured storage system according to the present disclosure. As shown in FIG. 9 and FIG. 10, as the number of the data units S increases, both the upload speed and download speed increase and then decrease slightly. Regardless of the number of data units S, the download speed is faster than the upload speed (because of the backup file CF of the cloud server 20).

Referring to FIG. 11A to FIG. 11D, the figures are graphs of acquisition rate of the cloud secured storage system according to the present disclosure. As shown in FIG. 11A to FIG. 11D, K is the number of backup files, q is the size of the stochastic matrix described in FIG. 4 and the corresponding paragraphs, and a is the probability that the cloud server 20 is online. Regardless of the probability a, the acquisition rate is close to 1 and greater than 0.75. That is, the download of the plurality of data chunks C is in full, and the integration of the user file UF is completed smoothly without the loss of the data chunks C.

Figure 12:
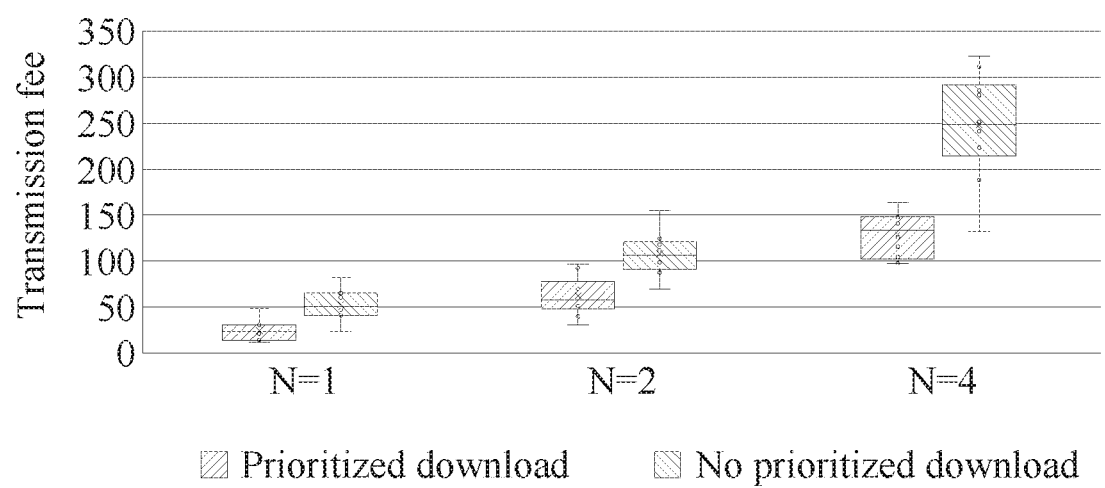
FIG. 12 is a transmission fee graph of the cloud secured storage system according to the present disclosure.

Referring to FIG. 12, the figure is a transmission fee graph of the cloud secured storage system according to the present disclosure. As shown in FIG. 12, the greater the number (N) of the public servers 23, the higher the transmission fee; adopting the plurality of cloud servers 20 with the right of the prioritized download may reduce the transmission fee.

Figure 13:
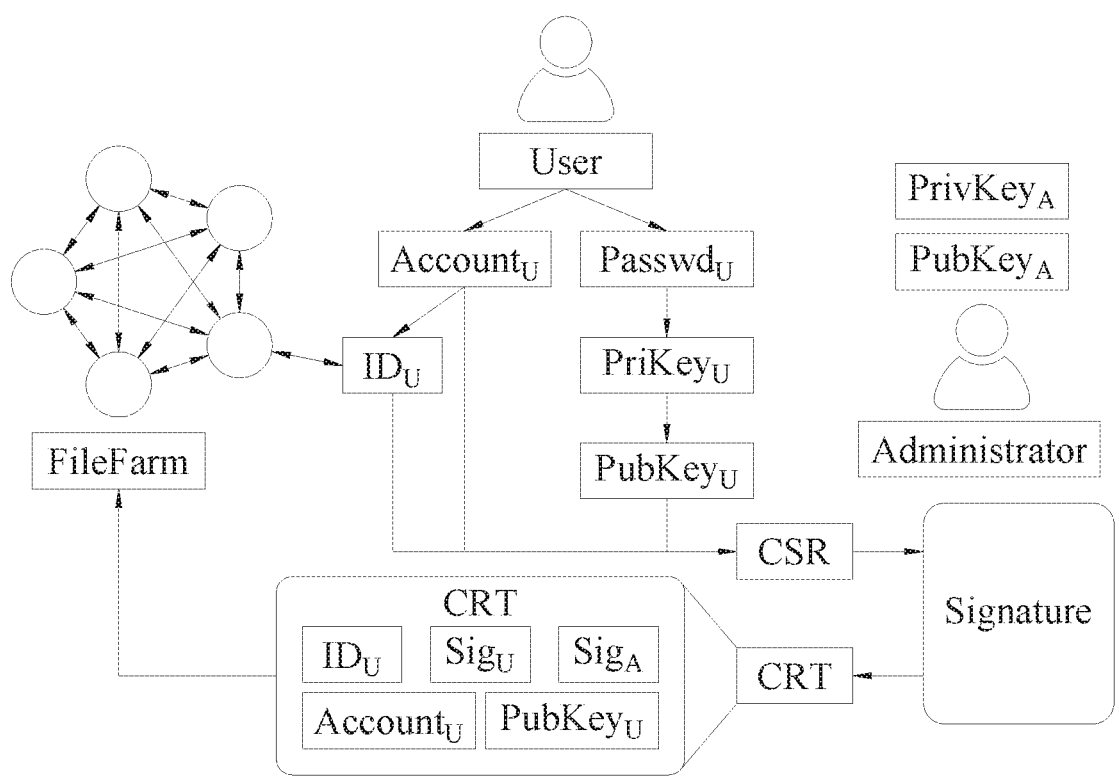
FIG. 13 is a registration schematic diagram of the third embodiment of the cloud secured storage system according to the present disclosure.
Figure 14:
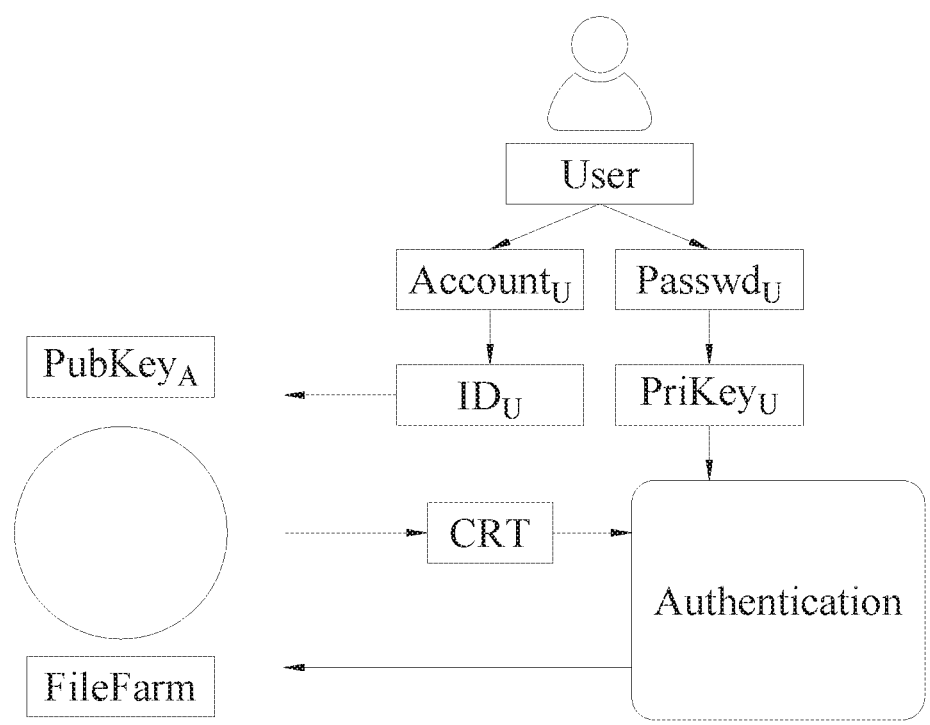
FIG. 14 is a login schematic diagram of the third embodiment of the cloud secured storage system according to the present disclosure.

Referring to FIG. 13 and FIG. 14, the figures are respectively a registration schematic diagram of the third embodiment of the cloud secured storage system according to the present disclosure and a login schematic diagram of the third embodiment of the cloud secured storage system according to the present disclosure. In the embodiment, the configuration of the same components with the same numerals is similar to that described above, so the similar descriptions are not to be described herein.

In the third embodiment, the uploading and downloading of the user file UF are the same as those in the previous embodiments, and the repeated description shall be omitted; the difference between the third embodiment and other embodiments lies in the mechanism of adding the mechanisms of registration and login, and the details of registration and login are described as follows.

As shown in FIG. 13, together with FIG. 2, a user creates an account $Account_U$ and a password $Passwd_U$ from the interface of an electronic device, the account $Account_U$ operates to determine the user identification number $ID_U$ through the operation of the hash function, and the user server 10 transmits the identification number $ID_U$ to the plurality of cloud servers 20 of the farm end FileFarm. The password $Passwd_U$ operates to determine the private key $PriKey_U$ through the operation of the hash function, and the user server 10 confirms whether the account $Account_U$ and the password $Passwd_U$ already exist to allow the user to use the account $Account_U$ and the password $Passwd_U$. The user server 10 generates the public key $PubKey_U$ according to the private key $PriKey_U$, and the signature of the user on the electronic device is marked as $Sig_U$.

Specifically, the user server 10 integrates the account $Account_U$, the identification number $ID_U$, the public key $PubKey_U$, the user information (such as name, phone, or address, etc.), and the signature $Sig_U$ into a certificate signing request CSR, and sends the certificate signing request CSR to the administrator. The administrator may decide whether to consent to the certificate signing request CSR transmitted by the user server 10. If the administrator consents, the administrator creates a signature $Sig_A$ and integrates it with the account $Account_U$, the identification number $ID_U$, the public key $PubKey_U$, the user information (such as name, phone, or address, etc.), and the signature $Sig_U$ as a certificate CRT. The administrator sends the certificate CRT to the plurality of cloud servers 20 of the farm end FileFarm. In the meantime, the administrator sends the certificate CRT to the user server 10 to notify the user that the registration is successful; if the administrator does not consent, the administrator does not consent to create the signature $Sig_A$.

As shown in FIG. 14, the user logs in the account $Account_U$ and password $Passwd_U$ from the interface of an electronic device, and the user server 10 transmits the identification number $ID_U$ to the plurality of cloud servers 20 of the farm end FileFarm (At the moment, the plurality of cloud servers 20 already have the public key $PubKey_U$). The user server 10 transmits the private key $PriKey_U$ to the plurality of cloud servers 20 of the farm end FileFarm to authenticate the password $Passwd_U$. The plurality of cloud servers 20 of the farm end FileFarm compare the public key $PubKey_U$ and the private key $PriKey_U$ to issue a certificate CRT, further consenting to the access of the user server 10. That is, the user may use the plurality of cloud servers 20 of the farm end FileFarm to upload or download the user file UF.

Accordingly, the cloud secured storage system of the present disclosure successfully stores the user file UF in the plurality of cloud servers 20 to prevent cyberattacks owing to the process of file segmentation, encryption, backup file, and algorithm. In summary, the cloud secured storage system of the present disclosure has the aforementioned advantages that may reduce transmission fees.

In this application, including the definitions below, the term "module", the term "engine" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The above description is merely illustrative rather than restrictive. Any equivalent modifications or alterations without departing from the spirit and scope of the present disclosure are intended to be included in the following claims.

What is claimed is:

1. A cloud secured storage system provided in a peer-to-peer network that comprises a client end and a farm end, comprising:
    a user server being provided on a node of the client end, receiving a user file, and comprising an encryption and decryption engine, an algorithm engine, and a first transmission interface; the user server being configured for segmenting the user file into a plurality of data units; the encryption and decryption engine being configured for encrypting each of the plurality of data units and utilizing a hash function to operate to determine a hash value of each of the data units; the algorithm engine being configured for generating a stochastic matrix according to a size of each of the data units being encrypted; the algorithm engine being configured for operating to determine a plurality of data chunks according to each of the data units being encrypted and the stochastic matrix; a number of the plurality of data chunks and a number of the plurality of data units being different from each other; the first transmission interface being configured for transmitting each of the plurality of data chunks; and
    a plurality of cloud servers being provided on a node of the farm end and each of the plurality of cloud servers having a second transmission interface and an identification number, the second transmission interface of one of the plurality of cloud servers being configured for receiving the plurality of data chunks, and the cloud server that receives the plurality of data chunks being configured for distributing the plurality of data chunks to the rest of the plurality of cloud servers according to each of the identification numbers and a hash value corresponding to each of the plurality of data chunks.

2. The cloud secured storage system according to claim 1, wherein the user server includes a database that stores the hash value respectively corresponding to each of the plurality of data chunks.

3. The cloud secured storage system according to claim 1, wherein when the plurality of cloud servers comprises an idle cloud server, one of the plurality of cloud servers detects the idle cloud server that does not store the data chunk to reach load balancing.

4. The cloud secured storage system according to claim 1, wherein each of the cloud servers backups the plurality of data chunks and stores the plurality of data chunks as a backup file.

5. The cloud secured storage system according to claim 4, wherein when the data chunk stored in one of the plurality of cloud servers is lost, the cloud server adjacent to the cloud server where the data chunk is lost transmits the backup file to the cloud server where the data chunk is lost.

6. A cloud secured storage system provided in a peer-to-peer network that comprises a client end and a farm end, comprising:
    a user server being provided on a node of the client end and comprising an encryption and decryption engine, an algorithm engine, and a first transmission interface, and the user server transmitting a download request that includes a hash value; and
    a plurality of cloud servers being provided on a node of the farm end and each of the plurality of cloud servers having a second transmission interface, an identification number; the second transmission interface of one of the plurality of cloud servers being configured for receiving the download request; the cloud server that receives the download request being configured for searching for a plurality of data chunks according to the hash value and collecting the plurality of data chunks from the cloud servers; the cloud server that receives the download request being configured for transmitting the plurality of data chunks to the user server; the user server being configured for confirming a number and sizes of the plurality of data chunks; the algorithm engine being configured for reconstructing a plurality of data units according to (i) an inverse stochastic matrix corresponding to each of the data chunks and (ii) each of the data chunks; the encryption and decryption engine being configured for decrypting the plurality of data units; the user server being configured for integrating the plurality of data units into a user file.

7. The cloud secured storage system according to claim 6, wherein when the plurality of cloud servers comprises an idle cloud server, one of the plurality of cloud servers detects the idle cloud server that does not store the data chunk to reach load balancing.

8. The cloud secured storage system according to claim 6, wherein each of the cloud servers backups the plurality of data chunks and stores the plurality of data chunks as a backup file.

9. The cloud secured storage system according to claim 8, wherein when the data chunk stored in one of the plurality of cloud servers is lost, the cloud server adjacent to the cloud server where the data chunk is lost transmits the backup file to the cloud server where the data chunk is lost.

10. The cloud secured storage system according to claim 6, wherein the plurality of cloud servers are divided into a private server and a public server;
    wherein when the second transmission interface of the private server receives the download request, the private server preferentially collects the data chunks that the cloud servers have; when the second transmission interface of the public server receives the download request, the public server searches for the plurality of corresponding data chunks according to the hash value and collects the plurality of data chunks from the cloud servers.

* * * * *